Patented Oct. 27, 1925.

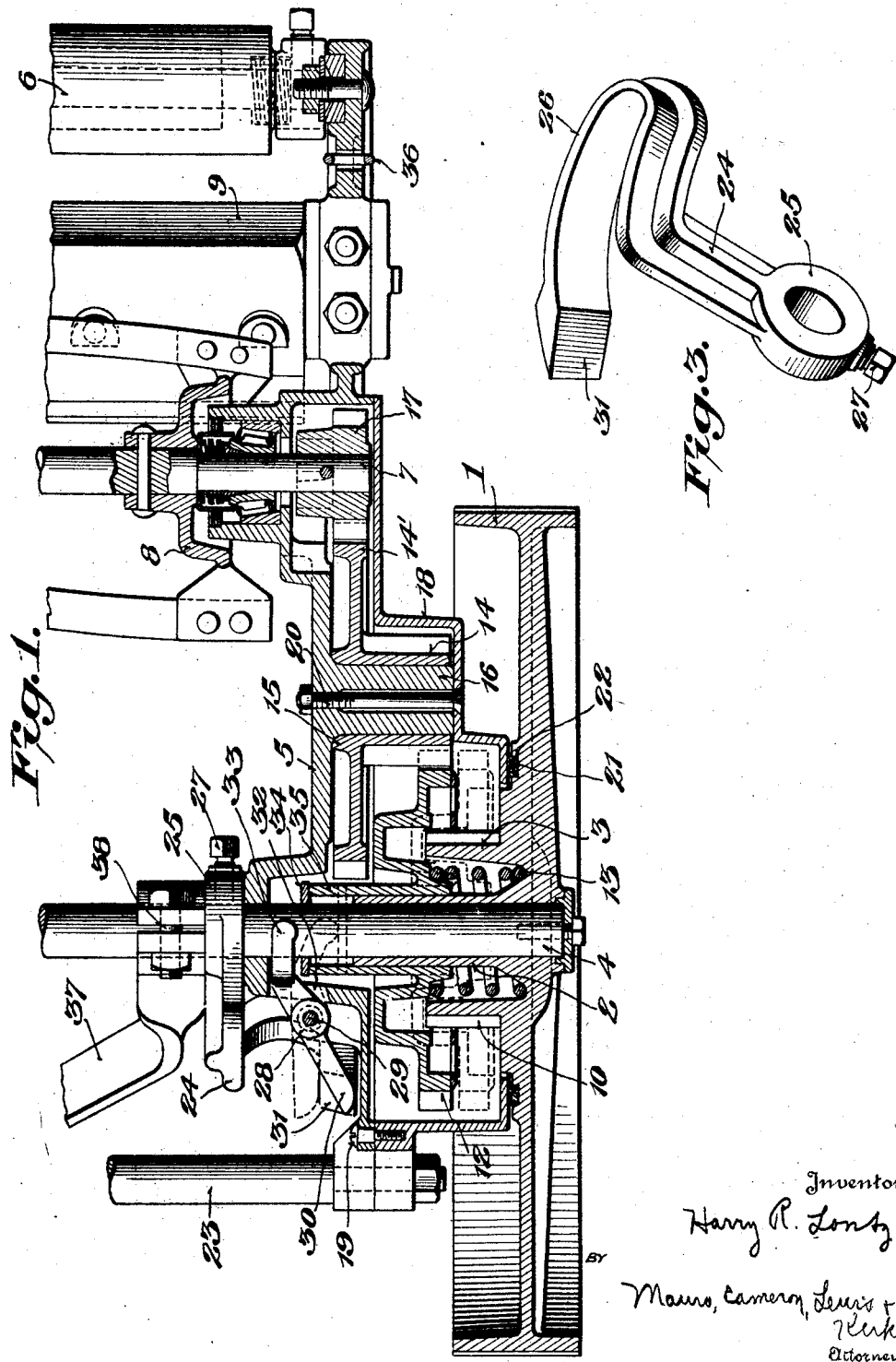

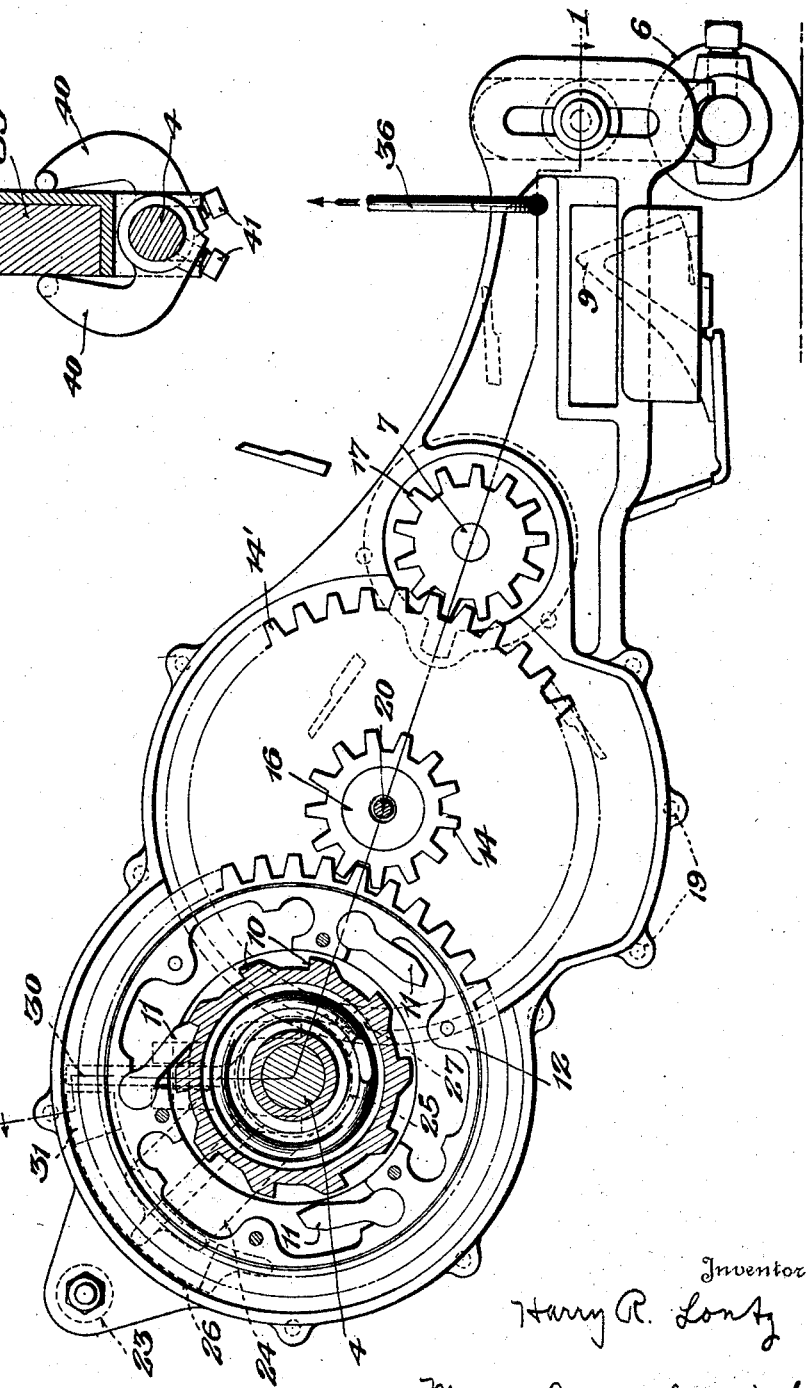

1,558,555

UNITED STATES PATENT OFFICE.

HARRY R. LONTZ, OF RICHMOND, INDIANA, ASSIGNOR, BY MESNE ASSIGNMENTS, TO THE F. & N. LAWN MOWER COMPANY OF DELAWARE, OF RICHMOND, INDIANA, A CORPORATION OF DELAWARE.

LAWN MOWER.

Application filed January 16, 1923. Serial No. 612,991.

*To all whom it may concern:*

Be it known that I, HARRY R. LONTZ, a citizen of the United States of America, and a resident of Richmond, Indiana, have invented new and useful Improvements in Lawn Mowers, which invention is fully set forth in the following specification.

This invention relates to lawn mowers of the rotating cutting-reel type, and particularly to means for disconnecting the cutting-reel from the driving means when the cutting mechanism is tilted or raised from the ground.

A train of gears is commonly employed, in lawn mowers of the rotating cutting-reel type, for transmitting the driving force of the ground-engaging wheels to the cutting-reel; and it has been proposed, heretofore, to provide coacting clutch elements on the contiguous faces of two of the members of the gear train which will be automatically disengaged when the cutting mechanism is raised or lifted from the ground, thereby rendering the reel inoperative.

The object of the invention is to provide a simple, cheap and durable structure of few parts and so arranged and operating as to minimize wear and the chance of the device getting out of order; and this is effected by eliminating the necessity for clutch elements and providing a gear which will be automatically moved out of mesh with one of the intermediate members of the gear train when the cutting mechanism is raised from the ground, thus preventing rotation of the reel when in an inoperative position.

The invention will be more readily understood by reference to the accompanying drawings, illustrating one expression of the inventive idea, and in which—

Fig. 1 is a sectional view taken on the line 1—1 of Fig. 2 of a sufficient portion of a lawn mower for illustrating one embodiment of the inventive idea;

Fig. 2 is a side elevation, partly in section, of the parts illustrated in Fig. 1, the ground-engaging driving wheel being omitted in the interest of clearness;

Fig. 3 is a detail perspective of one type of cam member which may be employed in the present invention; and Fig. 4 is a sectional detail illustrating one manner in which the mower may be attached to a draft member.

Referring to the accompany drawings, in which like reference numerals indicate like parts, 1 is a ground-engaging driving wheel having a laterally extending hub portion 2 and a concentrically disposed, annular portion 3 to be more fully described hereinafter. Extending within hub 2 and supported thereby is an axle 4, of which only a portion is shown, about which wheel 1 freely rotates when the mower is moved over the ground. A side frame 5 is mounted adjacent wheel 1, on axle 4, in such a manner that it is free to pivot about the same.

Rotatively mounted in the opposite end of frame 5 is the adjustable ground-engaging and supporting roller 6 of any suitable type well known in the art. Positioned intermediate axle 4 and roller 6 are the cutting-reel shaft 7, the spiders 8 and fixed knife 9 carried thereby, which may be of any desired construction.

In order to transmit the rotary movement of wheel 1, caused by moving the mower over the lawn, to cutting-reel shaft 7, annular portion 3 of the wheel is preferably provided with a plurality of teeth 10 which are engaged, during forward rotation of wheel 1, by pawl members 11 (Fig. 2) pivoted to the outer face of a driving gear 12 slidably mounted on hub 2. The teeth of gear 12 are normally held in mesh with the pinion portion 14 of a compound gear member or pinion-gear 15 rotatably mounted on a laterally extending portion 16 of frame 5, by means of a spring 13 interposed between said gear and wheel 1. The gear portion 14' of member 15 meshes, in turn, with a pinion 17 secured to the end of reel shaft 7. A cover 18, secured to frame 5 in any suitable manner, as by screws 19 and bolts 20, protects the gears from dirt, grass, etc. A washer 21, positioned in an annular groove 22, formed in the inner surface of wheel 1, and extending into engagement with cover 18, may be provided to insure against leakage of any lubricant from the gear housing formed by frame 5 and cover 18. If desired, the opposite frame members 5 may be rigidly held in proper spaced relation by means of a suitable tie rod 23. Any desired number and arrangement of tie rods may be employed.

When the mower is being moved over ground where it is not desired to cut the grass or other growth thereon, or where damage would result to the cutting mechanism from rocks, etc., it is common practice, particularly when the mower is one of a plurality of similar units in gang formation, to lift the rear end of the mower frame, or frames, and hold the same clear of the ground. In order to avoid unnecessary wear of the parts and useless expenditure of energy, it is desirable, when the mower is being thus moved, to prevent rotation of the cutting-reel. In the illustrated embodiment of the present invention, this disconnection of the cutting-reel from the driving wheels is obtained by providing suitable means for moving gear 12 out of mesh with pinion 14.

As shown, a cam member 24 having hub portion 25 and an outwardly extending U-shaped portion 26 is rigidly secured to axle 4, adjacent the inner side of frame 5, by means of a screw 27. A lever 28, pivoted to frame 5 in any suitable manner, as at 29, is provided with an outer arm 30 extending into lateral alinement with the beveled end 31 of cam 24. The inner arm of lever 28 which extends through an opening 32 in frame 5 is bifurcated (as shown in dotted lines in Fig. 2), the furcations 33 extending on either side of axle 4 for engagement with the flanged end 34 of the laterally extending hub 35 of gear 12. A lifting element 36 of any desired type may be attached to frame 5 or fixed knife 9 to facilitate raising the cutting mechanism from the ground. A draft bar 37 is preferably secured to axle 4, as by means of a bolt 38, to provide means for moving the mower over the ground and to insure against rotation of said axle.

The operation of the device is as follows: When the mower is moved over the ground, the rotation of the ground wheel 1 is transmitted by teeth 10, pawls 11, and gear train 12, 14, 14' and 17 to cutting-reel shaft 7. If it is desired to prevent rotation of shaft 7, the rear end of frame 5 is lifted from the ground by means of member 36, thus tilting the frame about axle 4 and forcing lever arm 30 into engagement with the inclined surface 31 of cam 24. This movement causes the fork 33 to move gear 12 outwardly, against the tension of spring 13, to the dotted line position of Fig. 1, and out of mesh with pinion 14, thus disconnecting the cutting-reel shaft from the driving power. It will be noted, however, that pawls 11 continue in engagement with teeth 10 and rotate gear 12 with the wheel, and when the cutting mechanism is again lowered to operative position, lever 28 is freed and spring 13 forces gear 12 back into mesh with pinion 14. If it is desired for any reason to prevent rotation of the cutting reel, without tilting roller 6 from the ground, screw 27 may be loosened, cam 24 rotated into engagement with lever arm 30, thus moving gear 12 to non-driving position, and screw 27 turned back into engagement with axle 4 to lock the cam to the same in this position.

When my improved mower is used in a gang formation, the gang frame may include a draft bar 39 of the type illustrated in section in Fig. 4, and axle 4 may be secured to bar 39 by means of oppositely disposed arms 40 rigidly secured to said axle by means of screws 41, thus insuring against rotation of the axle when the rear end of frame 5 is tilted from the ground.

If it is desired to drive the cutting-reel from each end thereof, a frame, gear train, cam and lever similar to those illustrated and described may be provided adjacent the opposite driving wheel (not shown).

The invention is capable of receiving a variety of mechanical expressions, one of which is illustrated in the accompanying drawings, but it is to be expressly understood that the drawings are for purposes of illustration only and are not designed as a definition of the limits of the invention, reference being had for this purpose to the appended claims.

What is claimed is:—

1. A lawn mower comprising a ground-engaging driving wheel, a gear slidably mounted on said wheel, a cutting-reel shaft driven by said wheel through said gear, and means for moving said gear to non-driving position.

2. A lawn mower comprising a ground-engaging driving wheel, a gear slidably mounted on said wheel, a pinion normally in mesh with said gear, a cutting-reel shaft driven by said wheel through said gear and pinion, and means for moving said gear out of mesh with said pinion.

3. A lawn mower comprising a driving wheel, a gear mounted concentrically with said wheel having relative lateral movement therewith, a pinion normally in mesh with said gear, a cutting-reel shaft driven by said wheel through said gear and pinion, and means for moving said gear out of mesh with said pinion.

4. A lawn mower comprising a driving wheel, a gear mounted concentrically with said wheel having relative lateral movement therewith, a pinion normally in mesh with said gear, a cutting-reel shaft driven by said wheel through said gear and pinion, means for moving said gear out of mesh with said pinion and means for moving said gear into mesh with said pinion.

5. A lawn mower comprising a driving wheel, a gear mounted concentrically with said wheel, a pinion normally in mesh with said gear mounted to rotate on an axis laterally spaced from and substantially parallel to the axis of said gear, a cutting-reel shaft driven by said wheel through said gear and pinion, and means for moving said gear out of mesh with said pinion.

6. A lawn mower comprising a driving wheel, a gear having direct driving engagement with said wheel, a pinion mounted to rotate on an axis laterally spaced from and substantially parallel to the axis of said gear, means normally maintaining said gear in peripheral mesh with said pinion, and means for moving said gear out of mesh with said pinion.

7. A lawn-mower comprising in combination, a driving wheel, a frame supported to swing about the axis of said wheel, a cutting-reel mounted in said frame, a gear mounted concentrically with said wheel, a pinion mounted to rotate about an axis laterally spaced from the axis of said gear, means normally maintaining said gear in mesh with said pinion, and means for moving said gear out of mesh with said pinion.

8. A lawn mower comprising a driving wheel, a cutting-reel, a train of gears interposed between the wheel and cutting-reel for driving the latter including a slidably mounted gear, a pinion meshing with said gear and mounted to rotate about an axis laterally spaced from and substantially parallel to the axis of said gear, and means for unmeshing said gear and pinion.

9. A lawn mower comprising a driving wheel, a cutting-reel, a train of gears interposed between the wheel and cutting-reel for driving the latter including a rotatably mounted gear, a pinion normally in mesh with said gear and mounted to rotate about an axis laterally spaced from and substantially parallel to the axis of said gear, a cam member, and a lever positioned to engage said cam member, and unmesh said gear and pinion.

10. A device of the class described, comprising, in combination, an axle, a ground-wheel rotatably mounted thereon, a frame supported at one end thereof by said axle, a rotary cutter mounted on said frame, a gear slidably mounted concentric with said axle, means interposed between said gear and said cutter for rotating the latter, a spring interposed between said wheel and gear for normally maintaining said gear in operative engagement with said means, a lever pivoted to said frame, and means engaging said lever to move the same to force said gear out of operative engagement with said means.

11. A device of the class described comprising, in combination with the ground-engaging wheel and rotary cutter of a lawn mower, a gear slidably mounted on the hub of said wheel concentric therewith, driving means interposed between said cutter and said gear, a spring interposed between said wheel and said gear and normally maintaining the latter in operative engagement with said means, and means for moving said gear out of operative engagement with said first-named means.

12. A device of the class described comprising, in combination with the ground-engaging wheel and rotary cutter of a lawn mower, means including a normally meshing gear and pinion for driving said cutter, said gear being mounted concentric with said wheel a spring normally maintaining said gear in driving position, and means actuated by raising said cutter from the ground for moving gear to non-driving position.

13. In a lawn mower, the combination with a mower frame, ground wheels supporting a portion of said frame, an independent rotary ground engaging device supporting other portions of said frame, a rotary cutter rotatably mounted in said frame adjacent said independent rotary device, means interposed between a ground wheel and said cutter for rotating the latter comprising a gear slidably mounted concentric with said wheel, and means for sliding said gear to inoperative position.

14. A lawn mower comprising, in combination with a mower frame and ground engaging driving wheels, a rotary cutter, a gear mounted concentric with one of said wheels for rotating said cutter, a lever pivoted to said frame and bifurcated at the lower end thereof, and means for actuating the lever to move said gear to non-driving position.

15. In a device of the class described, the combination with a mower frame, of an axle, a ground engaging driving wheel rotatably mounted thereon and provided with a hub, a driving gear slidably mounted on said hub, a lever pivoted to said frame having a bifurcated end positioned to engage said gear on both sides of said axle, a rotary cutter driven by said gear, and a cam member rigidly secured to said axle and adapted to engage said lever.

16. A device of the class described, comprising, in combination with a mower frame and cutter mechanism, an axle, a ground-engaging wheel rotatably mounted on said axle having a pair of concentric hub portions, a gear slidably mounted on the inner of said hub portions for driving said cutter mechanism, driving means pivoted to said gear and engaging the outer of said hub portions, and a resilient member normally maintaining said gear in driving position relative to said cutter mechanism.

17. A device of the class described, comprising, in combination with a mower frame and cutter mechanism, an axle, a ground-engaging wheel rotatably mounted on said axle having a pair of concentric hub portions, a gear slidably mounted on the inner of said hub portions for driving said cutter mechanism, driving means pivoted to said gear and engaging the outer of said hub portions, a spring normally maintaining said gear in driving position, and means for moving said gear to non-driving position.

18. A device of the class described, comprising, in combination with a mower frame and cutting mechanism, a ground-engaging wheel having a laterally extending hub portion, a gear slidably mounted on said hub portion for driving said cutting mechanism, and means for moving said gear to non-driving position.

19. A lawn mower comprising a ground engaging driving wheel, a gear having inner and outer series of teeth and having operative engagement with said wheel, a pinion normally in mesh with the outer peripheral teeth of said gear, a cutting reel shaft driven by said pinion, and means for unmeshing said gear and pinion.

20. A lawn mower comprising a shaft, a ground engaging driving wheel secured to the shaft, a gear having peripheral teeth mounted on said wheel, a cutting reel shaft operatively connected to said gear and driven thereby, and means for moving said gear to non-driving position.

21. A lawn mower comprising a shaft, a driving wheel secured to said shaft, a gear mounted on said wheel, a pinion in mesh with said gear, a cutting reel shaft driven by said pinion, and means for unmeshing said gear and pinion.

In testimony whereof I have signed this specification.

HARRY R. LONTZ.